(12) United States Patent  
Hsu

(10) Patent No.: US 8,594,999 B2  
(45) Date of Patent: *Nov. 26, 2013

(54) TYPING CANDIDATE GENERATING METHOD FOR ENHANCING TYPING EFFICIENCY

(71) Applicant: Academia Sinica, Taipei (TW)

(72) Inventor: Wen-Lian Hsu, Taipei (TW)

(73) Assignee: Academia Sinica, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,495

(22) Filed: Dec. 10, 2012

(65) Prior Publication Data

US 2013/0185053 A1  Jul. 18, 2013

Related U.S. Application Data

(63) Continuation of application No. 11/535,497, filed on Sep. 27, 2006, now Pat. No. 8,364,468.

(51) Int. Cl.
*G06F 17/27* (2006.01)

(52) U.S. Cl.
USPC .................................. 704/9; 704/1; 715/257

(58) Field of Classification Search
USPC .......................................... 704/1, 9; 715/257
See application file for complete search history.

(56) References Cited

U.S. PATENT DOCUMENTS

| | | | | |
|---|---|---|---|---|
| 6,047,300 | A * | 4/2000 | Walfish et al. ................. | 715/257 |
| 6,262,771 | B1 * | 7/2001 | Higurashi et al. ............. | 348/441 |
| 6,292,771 | B1 * | 9/2001 | Haug et al. ......................... | 704/9 |
| 6,332,158 | B1 * | 12/2001 | Risley et al. ................... | 709/219 |
| 6,393,444 | B1 * | 5/2002 | Lawrence ..................... | 715/257 |
| 6,616,704 | B1 * | 9/2003 | Birman et al. ................. | 715/234 |
| 6,820,075 | B2 * | 11/2004 | Shanahan et al. ............. | 715/205 |
| 7,117,144 | B2 * | 10/2006 | Goodman et al. ................. | 704/9 |
| 7,181,497 | B1 | 2/2007 | Appelman et al. | |
| 7,389,233 | B1 * | 6/2008 | Gish et al. ..................... | 704/270 |
| 7,453,439 | B1 * | 11/2008 | Kushler et al. ................ | 345/168 |
| 8,364,468 | B2 * | 1/2013 | Hsu .................................. | 704/9 |
| 2005/0052406 | A1 * | 3/2005 | Stephanick et al. .......... | 345/156 |
| 2005/0283726 | A1 * | 12/2005 | Lunati ........................... | 715/533 |
| 2007/0213983 | A1 * | 9/2007 | Ramsey ........................ | 704/254 |
| 2007/0240043 | A1 * | 10/2007 | Fux et al. ...................... | 715/533 |

FOREIGN PATENT DOCUMENTS

| | | |
|---|---|---|
| JP | 63-56756 | 3/1988 |
| JP | 01-214964 | 8/1989 |
| JP | 07-78165 | 3/1995 |
| JP | 10-187710 | 7/1998 |
| JP | 2003-514304 | 4/2003 |
| JP | 2003-223437 | 8/2003 |
| WO | WO2004/010323 | 1/2004 |
| WO | WO2005/036413 | 4/2005 |
| WO | WO2005/064587 | 7/2005 |

OTHER PUBLICATIONS

Wareseeker.com!, "EasyType 1.0 description," http://wareseeker.com/Business-Finanace/easytype-1.0.zip/4280 [retrieved:Jul. 2, 2009] (2 pages).

* cited by examiner

*Primary Examiner* — Douglas Godbold

(74) *Attorney, Agent, or Firm* — Occhiuti & Rohlicek LLP

(57) ABSTRACT

For relieving typing burdens caused by incorrect spellings, typing errors, unknown spellings, and characters with diacritical marks, and for enhancing a typing efficiency of a typist with some simplified techniques, several candidate generating methods are provided for assisting the typist to pick a candidate word from a list of generated candidate words, or for selecting a candidate word from said list of generated candidate words in an automatic-selection manner. A proper-designed user interface may also be utilized for implementing the candidate generating methods.

9 Claims, 6 Drawing Sheets

$$A = \begin{pmatrix} & PSC_0 & PSC_1 & PSC_2 & \cdots & PSC_j & \cdots & PSC_{N-1} \\ PSR_0 & A_{0,0} & A_{0,1} & A_{0,2} & \cdots & A_{0,j} & \cdots & A_{0,N-1} \\ PSR_1 & A_{1,0} & A_{1,1} & A_{1,2} & \cdots & & \cdots & A_{1,N-1} \\ PSR_2 & A_{2,0} & A_{2,1} & A_{2,2} & \cdots & & \cdots & A_{2,N-1} \\ \cdots & \cdots & \cdots & \cdots & & & & \cdots \\ PSR_i & A_{i,0} & & & & A_{i,j} & & \\ \cdots & \cdots & & & & & & \cdots \\ PSR_{M-1} & A_{M-1,0} & A_{M-1,1} & A_{M-1,2} & \cdots & & \cdots & A_{M-1,N-1} \end{pmatrix}$$

$PS_{Trow} = (PSR_0, PSR_1, PSR_2, \ldots, PSR_{M-1})$
$PS_{Tcolumn} = (PSR_0, PSR_1, PSR_2, \ldots, PSR_{N-1})$

Fig. 3

TYPING CANDIDATE GENERATING METHOD FOR ENHANCING TYPING EFFICIENCY

CROSS-REFERENCE TO RELATED APPLICATIONS

This application is a Continuation of U.S. application Ser. No. 11/535,497, filed on Sep. 27, 2006. The contents of the application are hereby incorporated by reference in its entirety.

BACKGROUND OF THE INVENTION

1. Field of the Invention

The present invention relates to a typing candidate generating method, and more particularly, to a typing candidate generating method for enhancing typing efficiency.

2. Description of the Prior Art

Typing on the computer or handheld devices is not difficult for alphabetic languages since the number of characters in the alphabets is quite limited. The alphabetic languages are also easily mapped to keypads on a standard keyboard. However, the typing efficiency of the alphabetic languages on the standard keyboard is easily hindered by incorrect spellings, typing errors, unknown spellings, and characters with diacritical marks (or accent marks). Correcting mistakes caused by said factors would obviously slow down the typing speed and interrupts the thought flow of the typists. Typing a word without knowing the exact spelling also involves a lot of guessing and dictionary look-up. Typing characters with diacritical marks (or accent marks) usually requires a specifically-designed keyboard layout, learning additional keystrokes, or combined keystrokes, which may also slow down said typing speed.

SUMMARY OF THE INVENTION

The claimed invention provides a typing candidate generating method for enhancing typing efficiency. The method includes providing a word dictionary and performing an auto-selection method that generates at least one candidate word from the word dictionary for adapting a user-typed sentence to match predetermined semantic properties according to predetermined statistical data, and utilizing the at least one candidate word in the user-typed sentence to match the semantic properties.

The claimed invention provides a typing candidate generating method for enhancing typing efficiency. The method includes providing a phonetic word dictionary. An input word is then segmented into a plurality of phonetic syllable sequences, each of the plurality of phonetic syllable sequences having a plurality of phonetic syllables. A plurality of candidate words including at least one candidate word for each of the plurality of phonetic syllable sequences according to a plurality of similarity matrices of the phonetic word dictionary is generated. A candidate word is picked from the plurality of candidate words and the input word is replaced with the picked candidate word, the picked candidate word having a smallest total substitution cost larger than zero of replacing the input word.

The claimed invention provides a typing candidate generating method for enhancing typing efficiency. The method includes providing a word dictionary and determining if at least one candidate word exists, where the at least one candidate word is a word in the word dictionary that comprises the input word as a subsequence of the at least one candidate word and found anywhere within the at least one candidate word. The at least one candidate word is selected to replace the input word if it was determined that the at least one candidate word exists.

The claimed invention provides a typing candidate generating method for enhancing typing efficiency. The method includes storing a word sequence and retrieving a word subsequence of the word sequence utilizing an acronym subsequence comprising a first character of one word and a first character of a subsequent word of the word sequence ordered in the order of corresponding words in the word sequence. Different word subsequences are retrieved from a same word sequence if a different one word and/or a different subsequent word are selected. The word subsequence comprises the one word, the subsequent word, and all intervening words between the one word and the subsequent word and ordered in the order of corresponding words in the word sequence.

The claimed invention provides a typing candidate generating method for enhancing typing efficiency. The method includes providing a word dictionary. At least one candidate word is generated according to possible diacritical marks of characters in an input word. A candidate word is picked from the at least one candidate word. A plurality of possible diacritical marks of characters for forming a word is stored in the word dictionary.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram illustrating a similarity matrix utilized in steps shown in FIG. 2.

DETAILED DESCRIPTION

For preventing a typist from being impeded by the above-mentioned mistakes, several typing candidate generating methods are provided in the present invention for facilitating the typist and overcoming the abovementioned defects.

A first candidate generating method of the present invention is for assisting a typist from being impeded by incorrect spellings. Incorrect spellings include errors of insertion, deletion, substitution, and permutation. A substitution error occurs if a character of a typed word is erroneously replaced by another one (or a small character to a capitalized character). A deletion error occurs if a character of a typed word is omitted. An insertion error occurs if an extra character is typed. A permutation error occurs if the order of two characters is reversed. No matter what type of incorrect spelling error occurs, as long as the number of spelling errors is small compared to the length of the word, a misspelled word will keep enough information to be revised. For example, a misspelled word "phenomanon" is a typo of "phenomenon", and merely a seventh character "e" is misspelled as "a" (a substitution error) with the other nine characters are correctly spelled. Therefore, such information would be employed to revise the misspelled word.

Figure 1:
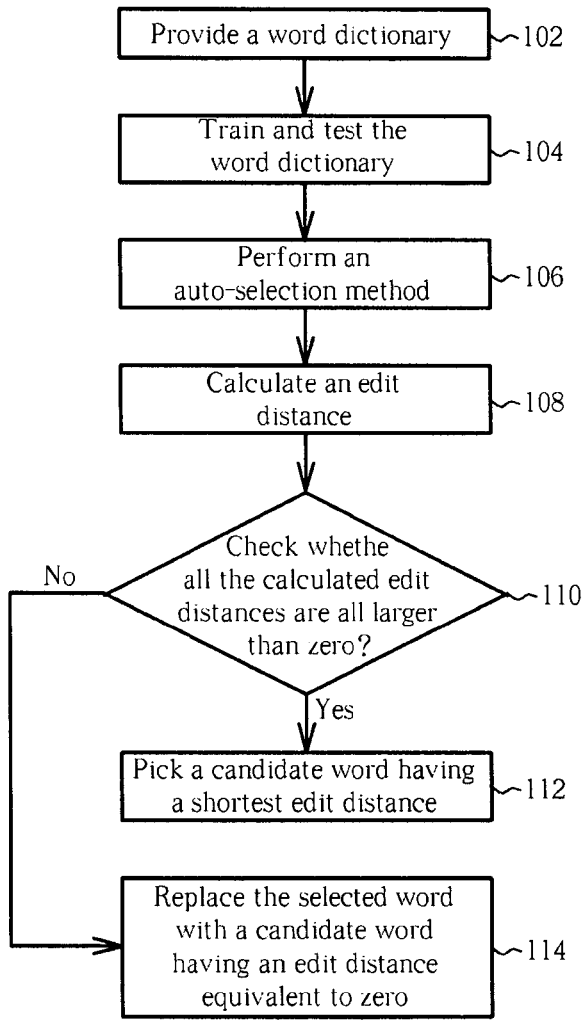
FIG. 1 is a flow chart of the typing candidate generating method for relieving incorrect spellings according to the present invention.

According to the abovementioned concept, the first typing candidate generating method is provided in the present invention and illustrated in FIG. 1, which is a flow chart of the typing candidate generating method for relieving incorrect spellings. The method illustrated in FIG. 1 comprises steps as follows.

Step 102: Provide a word dictionary.

Step 104: Train and test the word dictionary with a large plurality of sentences having a plurality of related words for establishing predetermined statistical data associated with semantic properties of the large plurality of sentences.

Step 106: Perform an auto-selection method that generates at least one candidate word from the word dictionary for adapting a user-typed sentence to match semantic properties of the user-typed sentence according to the predetermined statistical data.

Step 108: Calculate an edit distance between a selected word of the user-typed sentence and each of the at least one candidate word in the word dictionary.

Step 110: Check whether all the calculated edit distances are all larger than zero. When all the calculated edit distances are all larger than zero, go to step 112, otherwise, go to step 114.

Step 112: Pick a candidate word having a shortest edit distance from the plurality of candidate words, and replace the selected word with the picked candidate word.

Step 114: Replace the selected word with a candidate word having an edit distance equivalent to zero.

Step 102 and 104 indicate a procedure for preparing and establishing a word dictionary in advance for later steps shown in FIG. 1 since said later steps have to be performed with the aid of said word dictionary. The word dictionary may be a system dictionary, a domain dictionary, or a user dictionary. In some circumstances, the word dictionary comes from recent articles or paragraphs of a typist for matching a typing habit of the typist. No matter which type of word dictionary is utilized in Step 102 and 104, the utilized word dictionary has to be trained or tested to identify a large enough plurality of sentences, or even for acquiring statistical data associated with semantic properties of the plurality of sentences. The statistical data may be a frequency of various words in specific paragraphs or in a typist-typed paragraph, or be probabilities of permutations between various words, etc.

From Step 106 to 114, an auto-selection method is performed for determining a most probable candidate word, and for replacing an input word of the typist with the determined candidate word for matching semantic properties of a current sentence having the input word, which may be a misspelled word generated from the abovementioned types of incorrect spellings. Each possible candidate word relating to the input word is determined from the word dictionary according to an edit distance, which represents an effort of inserting, deleting, or substituting characters of the input word for transforming the input word into the possible candidate word. For example, for transforming an input word "phenomanon" into the candidate word "phenomenon", a character "a" has to be substituted with a character "e", and a related edit distance may be recorded as 1 for merely taking one substitution in characters. Similarly, when the input word comes to "phnocmanon", a related edit distance is 3 for inserting a character "e" between the "h" and the "n", deleting a character "c" between the "o" and the "m", and substituting a character "a" between the "m" and the "n" with a character "e". Note that the edit distance of the present invention may be defined in other ways, and should not be restricted by the abovementioned manner.

Having the edit distances of all the candidate words larger than zero indicates that the input word is a misspelled word. Then a candidate word having a smallest edit distance from the input word is automatically selected for replacing the input word. However, there may be more than one candidate word having a same smallest edit distance. For preventing such a situation from being a problem, the abovementioned statistical data related to semantic properties of a current paragraph having the input word is also utilized for determining possible candidate words with related edit distances. With the added condition about semantic properties, the domain of possible candidate words for the input word is significantly decreased, and facilitates the efficiency of determining possible candidate words as well as a typing efficiency of the typist. Therefore, the method of relieving incorrect spellings of the present invention works.

Furthermore, an N-gram model method, which follows semantic rules or be utilized in context-free grammars, or a linguistic template-matching system may also be utilized for enhancing the abovementioned method for relieving incorrect spelling of the present invention.

A user interface may be utilized for implementing the abovementioned method for relieving incorrect spelling according to the present invention. On the user interface, a plurality of possible candidate words of an input word may be listed, or even generated by compiling typist-typed documents while a related word dictionary refers to a recent paragraph typed by a typist. The user interface may also be designed for reporting any spelling errors made by the typist and recording such typing errors. Therefore, the recorded typing errors may also be utilized for decreasing the domain of possible candidate words along with the edit distances and the semantic properties. The recorded typing errors, which include inserting errors, deleting errors, substituting errors (or even permuting errors), may also be recorded along with sentences or phrases, which have said recorded typing errors, as a type of statistical data to be referenced thereby.

A second candidate generating method of the present invention is for facilitating a typist with simplified phonetic spellings of typed words. The basic concept of the second candidate generating method is described as follows. For alphabetic languages, if a typist does not remember how to spell a word, but knows roughly how to pronounce it, then the user could try to search for the word by guessing its approximate pronunciation. With the idea, a phonetic word dictionary storing a large plurality of phonetic syllables is required. When a typist cannot spell the word "bureaucracy" in English, he may type an approximate pronunciation based on a phonetic word, which intends to simulate the corresponding pronunciation, such as "burocrecy" or "burockrecy".

On receiving a phonetic word, a corresponding pronunciation of the phonetic word is decoded or guessed by segmenting the phonetic word into phonetic syllables in many possible ways, according to which a corresponding plurality of phonetic syllable sequences are generated. Each phonetic syllable sequence includes a plurality of phonetic syllables and corresponds to one said possible way.

Figure 2:
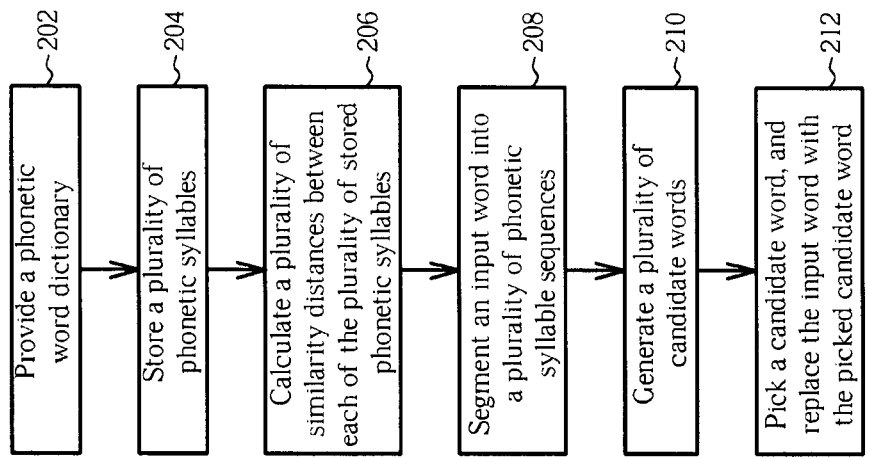
FIG. 2 is a flow chart illustrating a candidate generating method of the present invention for facilitating a typist with simplified phonetic spellings of typed words.

FIG. 2 is a flow chart illustrating the second candidate generating method of the present invention for facilitating a typist with simplified phonetic spellings of typed words. The second candidate generating method comprises the following steps.

Step 202: Provide a phonetic word dictionary.

Step 204: Store a plurality of phonetic syllables in the phonetic dictionary.

Step 206: Calculate a plurality of similarity distances between each of the plurality of stored phonetic syllables.

Step 208: Segment an input word into a plurality of phonetic syllable sequences, each of which comprising a plurality of phonetic syllables.

Step 210: Generate a plurality of candidate words comprising at least one candidate word for each of the plurality of phonetic syllable sequences according to a plurality of similarity matrices of the phonetic word dictionary.

Step 212: Pick a candidate word from the plurality of candidate words, and replace the input word with the picked candidate word having a smallest total substitution cost larger than zero of replacing the input word.

Steps 202 to 206, similarly to steps from 102 to 104, indicate preparing the phonetic word dictionary in advance for supporting later steps shown in FIG. 2. Besides the stored phonetic syllables, similarities, which may also be denoted as similarity distances, between phonetic syllables also have to be calculated and pre-stored in the phonetic word dictionary. A higher similarity distance between a first phonetic syllable and a second phonetic syllable indicates a smaller substitution cost of transforming the first phonetic syllable into the second phonetic syllable by inserting, deleting, substituting, or permuting characters of the first phonetic syllable whereas a lower similarity distance indicates a larger substitution cost, and vice versa. A similarity between a first phonetic syllable sequence and a second phonetic syllable sequence is defined by a similarity matrix. A row of the similarity matrix is listed with all phonetic syllables in the first phonetic syllable sequence whereas a column of the similarity matrix is listed with all phonetic syllables in the second phonetic syllable sequence.

Please refer to FIG. 3, which is a diagram of illustrating said similarity matrix. Assume a similarity matrix A is utilized for indicating a total substitution cost between a first phonetic syllable sequence $PS_{row}=(PSR_0, PSR_1, PSR_2, \ldots, PSR_{M-1})$, where $PSR_i(i=0,1,2,\ldots,M-1)$ indicates an i-th phonetic syllable in the phonetic syllable sequence $PS_{row}$, and a second phonetic syllable sequence $PS_{column}=(PSC_0, PSC_1, PSC_2, \ldots, PSC_{M-1})$, where $PSC_j(j=0, 1, 2, \ldots, N-1)$ indicates an j-th phonetic syllable in the phonetic syllable sequence $PS_{column}$. Moreover, M indicates a dimension of the phonetic syllable sequence $PS_{row}$, and N indicates a dimension of the phonetic syllable sequence $PS_{column}$. Then as shown in FIG. 3, a coefficient $A_{i,j}$ indicates a similarity between a phonetic syllable $PSR_i$ and a phonetic syllable $PSC_j$, where the value of said coefficient $A_{i,j}$ ranges from 0 to 1 in a preferred embodiment of the present invention. For calculating a total substitution cost between the phonetic syllable sequences $PS_{row}$ and $PS_{column}$, several possible methods may be utilized. In a preferred embodiment of the present invention, each smallest coefficient $A_{i,j}$ in each row or each column is summed as a representative total substitution cost of the similarity matrix A, or even a smaller total summed substitution cost between said row manner and said column manner is retrieved as a representative total substitution cost of the similarity matrix A, for comparing with representative total substitution costs of other similarity matrices. The difference between the dimensions of the phonetic syllable sequences $PS_{row}$ and $PS_{column}$ cannot be large, i.e. $||PS_{row}|-|PS_{column}||\leq d$ for a tolerable and properly-chosen value of d, where $|PS_{row}|$ and $|PS_{column}|$ indicate the dimensions of $PS_{row}$ and $PS_{column}$ respectively. In another embodiment of the present invention, a determinant of the similarity matrix A may also be utilized as a representative total substitution cost.

Therefore, similarity distances between all possible phonetic syllables are all pre-calculated and pre-stored in the phonetic word dictionary as well. Through steps 208 to 212, the second candidate word generating method is performed for determining a most probable candidate word, and for replacing an input word, which is inputted according to phonetic spelling, of a typist with the determined candidate word for matching phonetic properties of the input word with a highest matching probability. First, the input word has to be segmented into various possible phonetic syllable sequences, which have a plurality of phonetic syllables and represent various candidate words respectively, according to the phonetic spelling of the input word. Under standard circumstances, the abovementioned value d between both phonetic sequences segmented from the input word and each of said possible candidate words would be limited by utilizing a proper algorithm for filtering out candidate words having an intolerable value of d with respect to the input word. Then a smallest total substitution cost is generated by comparing a plurality of representative total substitution costs from various similarity matrices, each of which corresponds to a similarity between the input word and a possible candidate word as mentioned before. At last, the input word is transformed into a possible candidate word having said smallest total substitution cost with respect to said input word by inserting, deleting, substituting, or permuting characters of said input word. The aim of the second candidate generating method according to phonetic properties is thus achieved.

The abovementioned steps may be implemented with a proper-designed user interface and in an auto-selection manner. Therefore, once a typist types an input word according to phonetic spelling, said user interface may show a possible candidate word list for the typist to choose one favorite candidate word, or the input word is automatically replaced with a most probable candidate word by following the abovementioned procedures.

Sometimes it is troublesome to type a word having an overly large number of characters. Therefore, a third candidate generating method of the present invention provides a convenient way for mitigating such inconveniences by typing a subsequence of a word sequence of a target word, which a typist would like to type originally. For example, a word "psychology" may be typed as "pylg" because the word "psychology" contains all of the letters in the input "pylg" in the same order as found in the input "pylg". Based on the subsequence "pylg", possible candidate words, such as "psychological", "psycholinguistic", "physiology", containing "pylg" as a subsequence would be generated under with the aid of said third candidate generating method of the present invention. While typing an URL or an email address, said method may also be utilized. For example, one typist may type a subsequence "shsu" for indicating a word sequence http://ias1.iis.sinica.edu.tw/hsu/, which is typed by the typist before and stored as a reference.

Figure 4:
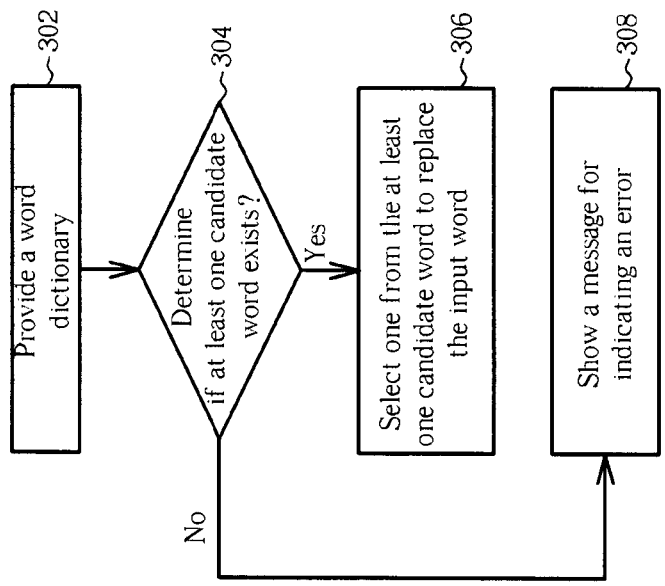
FIG. 4 illustrates a candidate generating method of the present invention by inputting a word subsequence of a target word.

Please refer to FIG. 4, which illustrates said third candidate generating method of the present invention by inputting a word subsequence of a target word. The steps shown in FIG. 4 are listed as follows.

Step 302: Provide a word dictionary.

Step 304: Determine if at least one candidate word, which is a word in the word dictionary that comprises an input word as a subsequence of the at least one candidate word and found anywhere within the at least one candidate word, exists. When the at least one candidate word exists, go to step 306, otherwise, go to step 308.

Step 306: Select one from the at least one candidate word to replace the input word.

Step 308: Show a message for indicating an error.

Similar to the abovementioned methods, a word dictionary is also provided for performing later steps. The word dictionary stores a plurality of candidate words, and provides an ability of recognizing a subsequence of the plurality of candidate words. While a typist types an input word, the word dictionary is searched for possible candidate words comprising said input word as a subsequence. If a list of possible candidates is found, the typist may choose a preferred word from said list of possible candidate words. With a proper-designed user interface, the list of possible candidate words may be displayed in a list for facilitating such choices of the typist. Moreover, with well-recorded statistical data, the frequencies of various possible candidate words may be pre-calculated, and such choices may also be automatically made with said statistical data in an auto-selection manner. However, when no possible candidate is found, a corresponding error message should also be listed to the typist for showing that the typist may have typed an erroneous input word and the input word does not match a subsequence of any candidate words.

A fourth candidate generating method is utilized on word sequences, such as phrases or sentences. Based on a word sequence in a sentence or a phrase and has been pre-stored, a corresponding "acronym sequence" taking the first character of each word in the sentence or phrase is pre-stored also. Then the typist may retrieve a continuous subsequence of words by typing a subsequence of its corresponding acronym sequence in such a way that the first character of the first word is typed first, and the first character of the last word is typed last. For example, if the typist has previously typed the following sequence: "I will visit the University of California at Los Angeles tomorrow", then a corresponding acronym sequence "iwvtuocalat" is automatically stored. The typist may retrieve the phrase "University of California at Los Angeles", whose corresponding acronym sequence is "uocala", by typing "ucla" or "uocla". Note that the fourth candidate generating method is different from the abovementioned methods so that a phrase dictionary is not provided for storing the phrase "University of California at Los Angeles", nor is a retrieval key, such as "ucla", for the typist to memorize. The typist has a total freedom to retrieve a phrase or a sentence based on any legal acronym subsequence for text typed before or stored in a specific user profile.

Figure 5:
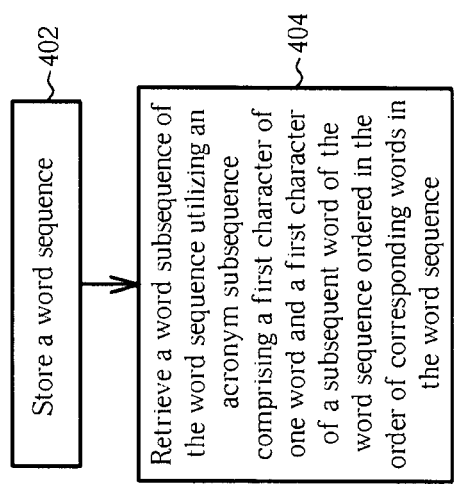
FIG. 5 illustrates a candidate generating method of the present invention by utilizing acronym subsequences of an original word sequence.

The fourth candidate generating method is illustrated in FIG. 5 as follows.

Step 402: Store a word sequence.

Step 404: Retrieve a word subsequence of the word sequence utilizing an acronym subsequence comprising a first character of one word and a first character of a subsequent word of the word sequence ordered in the order of corresponding words in the word sequence.

A user interface may be designed for implementing said method, and for generating a possible list of retrieved acronym subsequences to allow selection from the list when more than one acronym subsequence from one or more word sequences are retrieved utilizing a single acronym subsequence. The selection may also be implemented in an auto-selection manner for choosing a most probable word subsequence or a most probable word sequence according to statistical data or related probabilities.

A fifth candidate generating method of the present invention is utilized for enhancing typing characters with diacritical marks. With said method, characters with diacritical marks, for example, "Ö" and "Ü", may be replaced by similar "un-marked" characters, such as "O" and "U". Such un-marked characters may be converted automatically. Therefore, it is not necessary to resort to a specifically designed keyboard for most alphabetic languages containing such marked characters.

Figure 6:
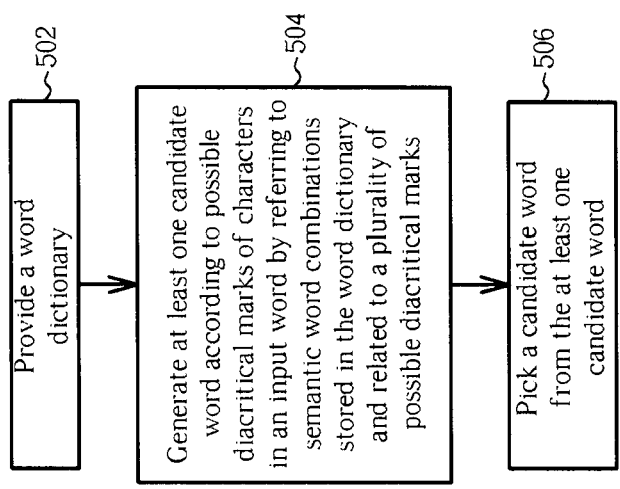
FIG. 6 illustrates a candidate generating method of the present invention for enhancing typing characters with diacritical marks.

The fifth candidate generating method of the present invention is illustrated in FIG. 6 and listed as follows.

Step 502: Provide a word dictionary.

Step 504: Generate at least one candidate word according to possible diacritical marks of characters in an input word by referring to semantic word combinations stored in the word dictionary and related to a plurality of possible diacritical marks.

Step 506: Pick a candidate word from the at least one candidate word.

In step 502, a word dictionary is provided for storing candidate words relating to semantic word combinations about characters with diacritical marks since a character may have a diacritical mark under certain situations whereas not have such diacritical mark under other situations. While a typist types an input word, a plurality of possible candidate words is searched according to possible semantic word combinations relating to diacritical marks and said input word. At last, the typist may pick one candidate word from the searched plurality of candidate words, or a most probable candidate word is picked automatically according to related frequencies or probabilities. A well-designed user interface may also be utilized for implementing the fifth candidate generating method for assisting the typist to choose a proper candidate word by listing said possible candidate words, or for automatically selecting one most probable candidate word.

Several candidate generating methods are provided in the present invention for relieving typing burdens caused by incorrect spellings, typing errors, unknown spellings, and characters with diacritical marks (or accent marks), and for enhancing a typing efficiency of a typist with some simplified techniques. The methods of the present invention employ some concepts, such as candidate word selection based on the context of the words in typist-typed sentences or phrases, or self-learning in the context typed by the typist through a user profile. Moreover, by some specific restrictions, possible candidate words may be significantly decreased for making better predictions in an auto-selection manner.

Many Asian languages adopt an alphabet-based typing method, such as Mandarin Pinyin Input, Cangjie Input, or Japanese Kanji Input. In the methods, a string of alphabets forms a code that retrieves a collection of candidate Asian characters. Therefore, by regarding Asian characters as words, all the candidate generating methods of the present invention may also be utilized for the Asian languages.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for processing text input from a user using an interactive text entry interface, the method comprising:
   maintaining a text storage representing words and word sequences previously accepted as sentence text input via the entry interface from the user;
   accepting further input comprising a sequence of input lexical items accepted via the entry interface from the user, the further input representing a desired sequence of one or more words of text input, wherein the desired sequence of one or more words corresponds to a representation as a sequence of lexical items from a predetermined set of lexical item, and the sequence of input lexical items comprises a subsequence of the lexical items of the representation of the desired sequence of one or more words;

searching the text storage of previously accepted words and word sequences without requiring prior specification of candidates as possible results of the searching to locate one or more candidates in which the sequence of input lexical items of the further input forms a subsequence of less than all the lexical items of a representation of the candidate; and determining the desired sequence of one or more words from the candidates located in the text storage.

2. The method of claim 1 wherein the predetermined set of lexical items comprises a set of letters of an alphabet.

3. The method of claim 2 wherein accepting further input comprises accepting a sequence of letters via the entry interface.

4. The method of claim 3 wherein accepting the sequence of letters via the entry interface comprises accepting said letters via a keyboard interface.

5. The method of claim 1 wherein the predetermined set of lexical items comprises a set of lexical items for representing characters of an Asian language.

6. The method of claim 5 wherein at least some characters of the Asian language are represented by a sequence of multiple lexical items of the predetermined set.

7. The method of claim 5 wherein the predetermined set of lexical items comprises items for representation of characters of an Asian language using an approach from a group consisting of Mandarin Pinyin Input, Cangjie Input, and Japanese Kanji Input.

8. The method of claim 5 wherein the desired sequence of one or more words of text input comprises a sequence of characters of an Asian language.

9. The method of claim 8 wherein for at least one characters of the sequence of characters, the sequence of input lexical items comprises a subsequence of the lexical items that represent that character.

* * * * *